United States Patent
Esmaili et al.

(10) Patent No.: US 7,606,681 B2
(45) Date of Patent: Oct. 20, 2009

(54) SYSTEM AND METHOD FOR PROCESS MONITORING

(75) Inventors: Ali Esmaili, Allentown, PA (US);
Sanjay Mehta, Alburtis, PA (US);
Debashis Neogi, Emmaus, PA (US);
Carlos A. Valenzuela, Bethlehem, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 189 days.

(21) Appl. No.: 11/934,156

(22) Filed: Nov. 2, 2007

(65) Prior Publication Data

US 2008/0109090 A1   May 8, 2008

Related U.S. Application Data

(60) Provisional application No. 60/856,757, filed on Nov. 3, 2006.

(51) Int. Cl.
*G06F 17/40* (2006.01)
*G06F 19/00* (2006.01)
*G05B 15/02* (2006.01)
*G05B 17/02* (2006.01)

(52) U.S. Cl. .................. 702/187; 340/3.1; 340/500; 340/517; 340/521; 340/522; 340/540; 340/679; 340/870.01; 340/870.07; 340/870.16; 700/9; 700/83; 700/90; 700/95; 700/108; 702/182; 702/183; 702/189; 715/700; 715/764; 715/781; 715/804

(58) Field of Classification Search .................. 340/3.1, 340/3.43, 500, 517, 521, 522, 540, 679, 825, 340/825.36, 870.01, 870.07, 870.16; 700/1, 700/9, 83, 90, 95, 108; 702/1, 33, 34, 35, 702/127, 182, 183, 187, 188, 189; 715/100, 715/243, 700, 764, 769, 771, 772, 781, 804
See application file for complete search history.

(56) References Cited

U.S. PATENT DOCUMENTS 2,883,255 A * 4/1959 Anderson .................. 346/34

(Continued)

FOREIGN PATENT DOCUMENTS

EP   1420313 A2   5/2004

(Continued)

OTHER PUBLICATIONS www.umetrics.com, "SIMCA-P+—The Solution for Batch Analysis," Umetrics (1 Page).

(Continued)

*Primary Examiner*—Edward R Cosimano
(74) *Attorney, Agent, or Firm*—Willard Jones, II

(57) ABSTRACT

Systems and methods are provided that allow a user to monitor, diagnose, and configure a process. A user interface may be presented that displays data received from process monitors, sensors, and multivariate models. The user interface may be interactive, allowing a user to select which composite and multivariate models are displayed. The user interface and multivariate model may be constructed and updated in real time. The user interface may present various data and interfaces, such as a representation of a composite variable in a multivariate model, a representation of the contribution of process variables to the composite variable, and a representation of a subset of the process variables. The user may select a point of the composite variable for analysis, and the interface may indicate the contribution and values of process variables at the selected point. The interface may be transmitted to a remote user.

25 Claims, 10 Drawing Sheets

U.S. PATENT DOCUMENTS

| | | | |
|---|---|---|---|
| 3,522,588 A * | 8/1970 | Clarke, Jr. et al. ...... 340/825.56 |
| 5,257,206 A | 10/1993 | Hanson |
| 5,339,257 A | 8/1994 | Layden et al. |
| 5,396,416 A | 3/1995 | Berkowitz et al. |
| 5,479,340 A | 12/1995 | Fox et al. |
| 5,548,520 A | 8/1996 | Nakamura et al. |
| 5,659,667 A | 8/1997 | Buescher et al. |
| 5,758,047 A | 5/1998 | Lu et al. |
| 5,862,051 A | 1/1999 | Barbur |
| 5,862,054 A | 1/1999 | Li |
| 5,862,060 A | 1/1999 | Murray, Jr. |
| 5,949,678 A | 9/1999 | Wold et al. |
| 6,115,643 A | 9/2000 | Stine et al. |
| 6,532,427 B1 | 3/2003 | Joshi et al. |
| 6,532,555 B1 | 3/2003 | Miller et al. |
| 6,546,508 B1 | 4/2003 | Sonderman et al. |
| 6,564,119 B1 | 5/2003 | Vaculik et al. |
| 6,577,323 B1 | 6/2003 | Jamieson et al. |
| 6,587,108 B1 | 7/2003 | Guerlain et al. |
| 6,616,759 B2 | 9/2003 | Tanaka et al. |
| 6,650,958 B1 | 11/2003 | Balazs et al. |
| 6,703,250 B2 | 3/2004 | Chiu |
| 6,704,691 B2 | 3/2004 | Chiou |
| 6,711,731 B2 | 3/2004 | Weiss |
| 6,723,574 B1 | 4/2004 | Bailey, III et al. |
| 6,725,402 B1 | 4/2004 | Coss, Jr. et al. |
| 6,727,106 B1 | 4/2004 | Ankutse et al. |
| 6,751,575 B2 | 6/2004 | Lenz et al. |
| 6,757,579 B1 | 6/2004 | Pasadyn |
| 6,789,032 B2 | 9/2004 | Barbour et al. |
| 6,799,311 B1 | 9/2004 | Ryskoski |
| 6,804,563 B1 | 10/2004 | Lafaye de Micheaux |
| 6,804,619 B1 | 10/2004 | Chong et al. |
| 6,823,287 B2 | 11/2004 | Shafer et al. |
| 6,830,939 B2 | 12/2004 | Harvey et al. |
| 6,842,720 B2 | 1/2005 | Chang |
| 6,859,754 B2 | 2/2005 | Shieh |
| 6,885,907 B1 | 4/2005 | Zhang et al. |
| 6,893,882 B2 | 5/2005 | Sun et al. |
| 6,901,560 B1 | 5/2005 | Guerlain et al. |
| 6,904,384 B2 | 6/2005 | Tai |
| 6,909,990 B2 | 6/2005 | Okazaki et al. |
| 6,909,993 B2 | 6/2005 | Nakao et al. |
| 6,915,173 B2 | 7/2005 | Chan et al. |
| 6,952,657 B2 | 10/2005 | Jahns et al. |
| 6,959,252 B2 | 10/2005 | Tai et al. |
| 6,961,732 B2 | 11/2005 | Hellemann et al. |
| 6,980,873 B2 | 12/2005 | Shen |
| 6,985,779 B2 | 1/2006 | Hsiung et al. |
| 6,985,787 B2 | 1/2006 | Klekotka |
| 7,000,193 B1 | 2/2006 | Impink, Jr. et al. |
| 7,010,382 B2 | 3/2006 | Cheng et al. |
| 7,016,754 B2 | 3/2006 | Poolla et al. |
| 7,016,816 B2 | 3/2006 | Mott |
| 7,025,280 B2 | 4/2006 | Kaushal et al. |
| 7,035,452 B2 | 4/2006 | Akiyoshi et al. |
| 7,054,480 B2 | 5/2006 | Levin et al. |
| 7,054,703 B2 | 5/2006 | Wu et al. |
| 7,054,919 B2 | 5/2006 | Cramer et al. |
| 7,062,411 B2 | 6/2006 | Hopkins et al. |
| 7,062,417 B2 | 6/2006 | Kruger et al. |
| 7,065,425 B1 | 6/2006 | Kay et al. |
| 7,082,338 B1 | 7/2006 | Chen et al. |
| 7,082,381 B1 | 7/2006 | Saghier et al. |
| 7,096,085 B2 | 8/2006 | Paik |
| 7,096,153 B2 | 8/2006 | Guralnik et al. |
| 7,096,315 B2 | 8/2006 | Takeda et al. |
| 7,107,112 B2 | 9/2006 | Brown |
| 7,113,838 B2 | 9/2006 | Funk et al. |
| 7,117,058 B2 | 10/2006 | Lin et al. |
| 7,123,980 B2 | 10/2006 | Funk et al. |
| 7,124,150 B2 | 10/2006 | Majjasie et al. |
| 7,127,314 B2 | 10/2006 | Pan et al. |
| 7,127,359 B2 | 10/2006 | Chityala et al. |
| 7,136,864 B2 | 11/2006 | Jeon |
| 7,139,620 B2 | 11/2006 | Yamazaki et al. |
| 7,139,672 B2 | 11/2006 | Dorough et al. |
| 7,151,972 B2 | 12/2006 | Denton et al. |
| 7,151,976 B2 | 12/2006 | Lin |
| 7,171,340 B2 | 1/2007 | Brocklebank |
| 7,174,283 B2 | 2/2007 | Berkooz et al. |
| 7,181,375 B2 | 2/2007 | Rao et al. |
| 7,187,988 B2 | 3/2007 | Ta |
| 7,187,990 B2 | 3/2007 | Jang et al. |
| 7,188,050 B2 | 3/2007 | Yuan et al. |
| 7,194,325 B2 | 3/2007 | Lee et al. |
| 7,198,964 B1 | 4/2007 | Cherry et al. |
| 7,200,524 B2 | 4/2007 | Kang et al. |
| 7,206,721 B1 | 4/2007 | Lin et al. |
| 7,209,846 B2 | 4/2007 | Tamaki et al. |
| 7,212,952 B2 | 5/2007 | Watanabe et al. |
| 7,218,974 B2 | 5/2007 | Rumi et al. |
| 7,221,987 B2 | 5/2007 | Bett et al. |
| 7,221,991 B2 | 5/2007 | Matsushita et al. |
| 7,221,997 B2 | 5/2007 | Bongers et al. |
| 7,225,368 B2 | 5/2007 | Lancaster |
| 7,233,834 B2 | 6/2007 | McDonald, Jr. et al. |
| 7,233,882 B2 | 6/2007 | Srinivasan et al. |
| 7,239,930 B2 | 7/2007 | Burda et al. |
| 7,243,048 B2 | 7/2007 | Foslien et al. |
| 7,248,939 B1 | 7/2007 | Chamness et al. |
| 7,249,356 B1 | 7/2007 | Wilson et al. |
| 6,952,808 B1 | 12/2007 | Jamieson et al. |
| 2002/0042694 A1 | 4/2002 | Henry et al. |
| 2002/0177909 A1 | 11/2002 | Fu et al. |
| 2003/0065462 A1 | 4/2003 | Potyrailo |
| 2003/0233198 A1 | 12/2003 | Taguchi et al. |
| 2004/0172153 A1 | 9/2004 | Zhang et al. |
| 2004/0225377 A1 | 11/2004 | Kokotov et al. |
| 2005/0268197 A1 | 12/2005 | Wold |
| 2007/0005266 A1 | 1/2007 | Blevins et al. |
| 2007/0021859 A1 | 1/2007 | Lev-Ami et al. |
| 2007/0088528 A1 | 4/2007 | Miller |
| 2009/0149981 A1* | 6/2009 | Evans et al. ............ 700/110 |

FOREIGN PATENT DOCUMENTS

| | | |
|---|---|---|
| JP | 9146610 | 6/1997 |
| JP | 9146611 | 6/1997 |
| WO | 01/50209 A1 | 7/2001 |
| WO | 01/56072 A1 | 8/2001 |
| WO | 03/023687 A2 | 3/2003 |
| WO | 03/058687 A1 | 7/2003 |
| WO | 03/105210 A1 | 12/2003 |
| WO | 2004/027644 A2 | 4/2004 |
| WO | 2004/032194 A2 | 4/2004 |
| WO | 2004/068136 A1 | 8/2004 |
| WO | 2005/036314 A2 | 4/2005 |
| WO | 2006/001416 A1 | 1/2006 |
| WO | 2006/031635 A2 | 3/2006 |

OTHER PUBLICATIONS www.umetrics.com, "SIMCA-4000—Track Your Process in Real-Time," Umetrics (2 Pages).

www.umetrics.com, "SIMCA-Batch On-Line—Batch Monitoring Made Easy," Umetrics (2 Pages).

www.umetrics.com, "SIMCA-P—The Standard in Multivariate Technology," Umetrics (3 Pages).

* cited by examiner

SYSTEM AND METHOD FOR PROCESS MONITORING

CROSS-REFERENCE TO RELATED APPLICATIONS

This application claims the benefit of U.S. Provisional Application No. 60/856,757 filed Nov. 3, 2006, the disclosure of which is incorporated by reference in its entirety.

BACKGROUND OF THE INVENTION

Process control systems, such as those used in the chemical processing and supply fields, typically collect a wide variety of data within a process plant environment. This data is often stored and used to identify faults and potential upcoming faults in the system. For example, the data may be examined after a process failure to identify a problem that resulted in an unusable batch of material, or to identify a component that failed or is expected to fail within a specific time frame.

Automated process control systems often are used to manage groups of sensors in a process plant. These process control systems typically monitor conditions in a process plant environment, and adjust process parameters based on conditions observed by the sensors. However, these automated systems can only take action based on the specific data available to them and specific pre-defined thresholds. When undesirable conditions result due to interactions among components and/or conditions within the process plant, or unexpected fault conditions occur, an automated system typically is unable to make an appropriate and complete response.

Thus, some supervisory monitoring of the process plant is required. This may require human operators to manage and respond to data from thousands of sources, which can be effectively infeasible. The human operator also must maintain a physical presence at the process plant to allow for prompt response to fault conditions.

BRIEF SUMMARY OF THE INVENTION

A system and method for process monitoring, advisory control and diagnosis is provided. A multivariate model of a process plant and/or a process may be created. The model may be created in real time as data is received from the process plant. Composite variables of the model may be displayed graphically to a user, allowing the user to track progression of the process and identify potential issues requiring intervention. A user also may select points of the model for which further information is desired, and identify the contribution of various process variables to the model at that point. Information about a single process variable may be extracted and presented to the user. The user may access and operate the system remotely, allowing the process plant to be monitored from a variety of locations regardless of their geographic proximity to the process plant. The system may be accessed using a web-based interface.

DETAILED DESCRIPTION OF THE INVENTION

Systems and methods are provided to allow for remote monitoring and/or advisory control of a process plant using an interactive interface. A system according to the present invention may receive process monitoring data and construct a multivariate model of the process. Based on the multivariate model, a user interface may be presented to a user, who may be geographically remote from the process being monitored. The user interface may present various data, such as composite variables generated as part of the model, the contributions of various process variables to the model, time-based displays of the model and aspects of the model, and other data. Process monitoring data may be received in real time, and the user interface may be updated in real time.

Figure 1:
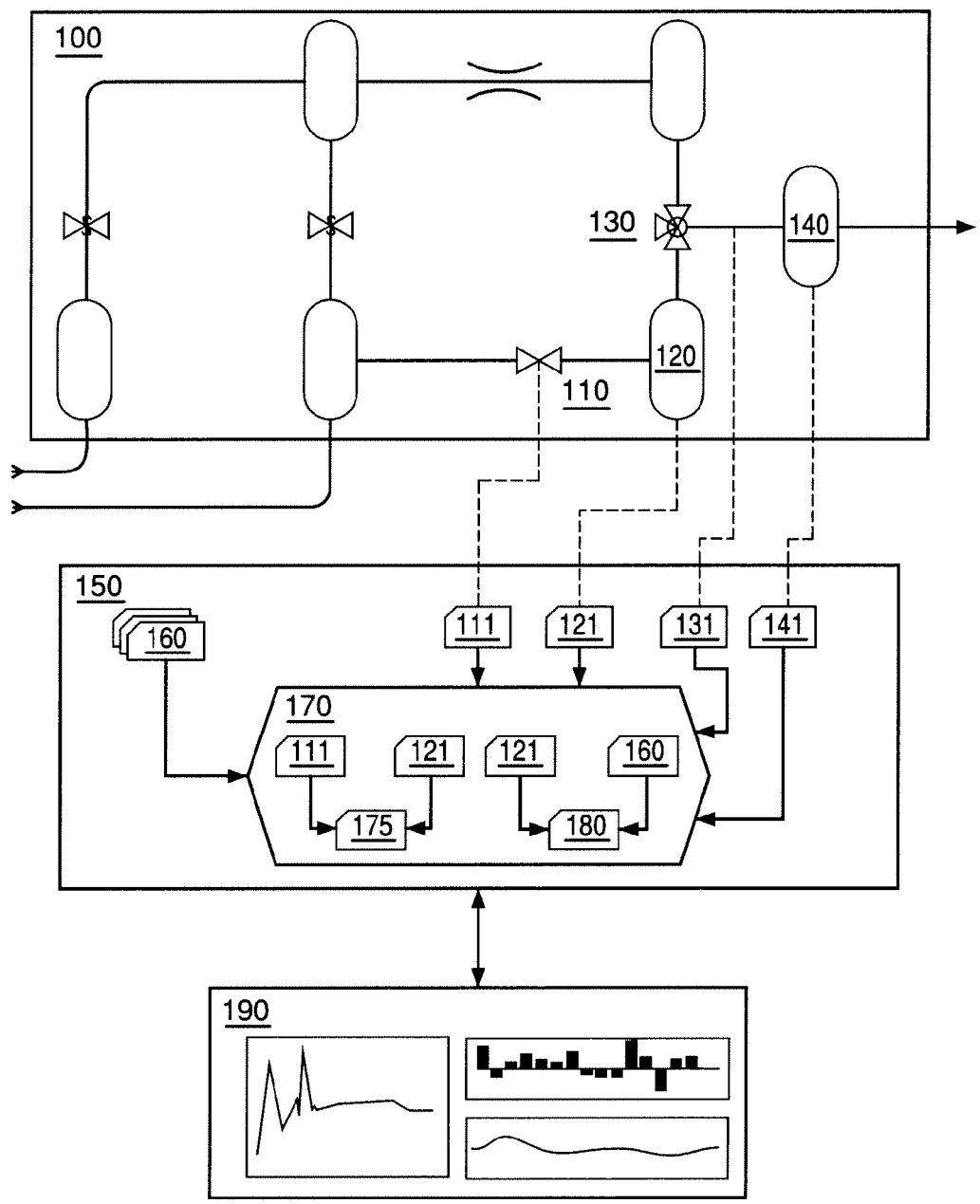
FIG. 1 shows a schematic representation of an exemplary process plant, computer system, and user interface according to the invention.

FIG. 1 shows a schematic representation of an exemplary process plant, computer system, and user interface according to the invention. A process plant 100 may include multiple entities 110, 120, 130, 140 that may be monitored during performance of a process. A process plant refers to any physical structure that is designed to perform a complex process. Examples of process plants include pilot plants, chemical processing, manufacturing, gas generation, coating, pharmaceutical processing and manufacturing, biologics processing and manufacturing, and other fabrication plants. Entities in a process plant may be, for example, valves, storage tanks, feed lines, ovens, condensation chambers, chemical reactors, bioreactors, fermentors, purifiers, and any other entity used in a process plant. Other entities, structures, and devices may be used. Each entity may be monitored by a process monitor, which can be any appropriate sensor. For example, a process monitor may record the temperature, pressure, and/or other relevant data about an entity in the process plant. The system may include other sensors or provide other process variables, such as ambient data, data from past processing steps, input material properties, and processing time, as well as any other process variable captured by the process plant.

A computer system 150 may receive values for the various process variables monitored by the system. Each process variable 111, 121, 131, 141 may be associated with one or more monitored entities. In the exemplary system shown in FIG. 1, process variable 111 is associated with process plant item 110, process variable 121 is associated with item 120, and so on. Additional process variables 160 may provide other data and/or be received from other entities in the process plant. The system may create a multivariate model 170 using the various process variables available from the process plant. The multivariate model may, in part, create composite variables 175, 180. As described in further detail below, a composite variable describes information about and relationships between two or more variables used to construct a multivariate model of a process. For example, a composite variable may be a principal component as derived from principal component analysis techniques. Thus, composite variables can provide summary or combined information about multiple items and events in the process plant.

The computer system 150 may provide a user interface 190. The user interface 190 may display various data and models related to the process performed by the process plant 100, using the multivariate model 170 and/or other data provided by the computer system 150. The user interface may be updated in real time. As used herein, a series of events occurs in "real time" if the events occur without appreciable delay from one to the next, other than delay inherent in any reporting or processing system, and specifically any unavoidable delay inherent in the system described as operating in real time. For example, there may be a small, unavoidable and non-cumulative delay between when data is sent from a sensor to a computer system and when the data is displayed to a user. However, such a process would still be considered to occur in "real time" where the computer system does not store the data for an extended period of time prior to displaying the data. A "real time" process thus may have a persistent, relatively small delay, though generally the delay is non-cumulative during the process.

The user interface 190 also may be provided to a user that is geographically separated from the process plant itself. As used herein, a user is "remote" from a process or a process plant if the user is geographically separated from the process or plant. Typically, a communication network may be used to connect a computer system used by a remote user to a computer system associated with the process. The user interface may allow a remote user to monitor, control, and/or diagnose issues in the process plant. The computer system 150 may be the system that creates and displays the user interface 190, or it may be in communication with a separate system that displays the interface to the user. In some configurations, the user interface may be a web-based interface that can be displayed in and manipulated using a standard web browser. This may further increase availability of the system, since the majority of end-user computer systems in use have a web browser installed. A user thus need not install software that is specific or proprietary to a monitoring system to use interfaces according to the invention. This may be true even where the user is remote from the monitored system, since the system may provide the user interface over a network connection, such as where the interface is provided to a remote user over the Internet.

A system according to the present invention may use a multivariate model to provide information about a process. In general, multivariate projection methods compress existing variables in a complex process into a smaller number of latent variables or principal components. The principal components summarize the highest sources of variability in a set of process data, allowing each observation to be represented by a small number of principal components instead of, for example, several hundred individual variables. Principal components typically are a linear combination of the original variables. A multivariate model also may include an indication of the importance of each variable to each of the principal components in the model, such as by using weighted coefficients for each process variable. As used herein, a composite variable may be the principal component of a multivariate model.

The interpretation of the value of each principal component per observation and the corresponding coefficients for each process variable can provide insight into the operational region defined by the related data. This also may indicate correlations and dependencies among the original process variables.

Figure 2:
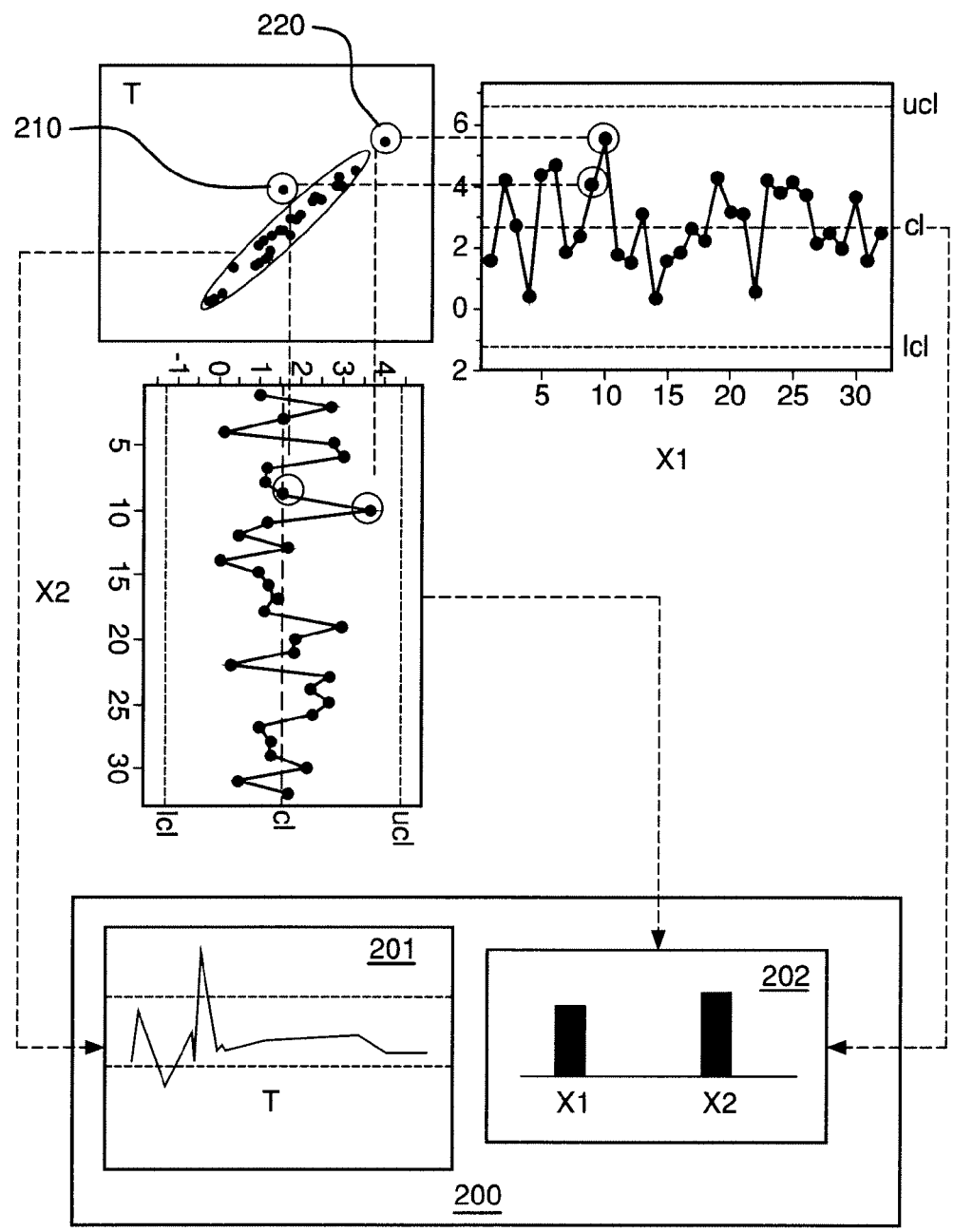
FIG. 2 shows an exemplary composite variable T created from two process variables X1 and X2 and a corresponding user interface according to the invention.

FIG. 2 shows a simplified example of a composite variable vector T created from two process variables X1 and X2 and a corresponding user interface according to the invention. Typically, a process control system may include expected control limits for a process variable being monitored. For example, during normal operation of a process it may be expected that the process variables X1, X2 would each have values within the upper and lower limits ("ucl" and "lcl," respectively). However, in some cases a process may fail, be performed incorrectly, or be incomplete even though all process variables have values within the expected ranges. In such a situation, a composite variable may provide further information about why the process failed.

For example, the plots shown in FIG. 2 may represent the progression of the two process variables X1 and X2 over time. At each point in time, each of the process variables is within the control limits. A multivariate model may define a composite variable, T, that shows the relationship between X1 and X2. For example, FIG. 2 shows T defined as a plot of X1 versus X2. By examining T, it may be possible to determine conditions that result in a process failure even when each individual variable X1, X2 is within expected bounds. This is illustrated by the two points 210, 220 in FIG. 2 that are outside the multivariate control limits. For example, a point 220 that lies along the defined multivariate model but outside expected ranges for the composite variable indicates a deviation from the mean for the composite variable. A point 210 that lies outside the model may indicate a deviation of the composite variable from the modeled values.

A user interface 200 according to the invention may present composite variables of a multivariate model to the user in a variety of ways. The values of a composite variable 201 and the contribution of each process variable to the composite variable 202 may be displayed. The user interface also may update each display in real time as data is received from a process plant. The various displays 201, 202 also may be linked and interactive, such as where selecting a point in the composite display 201 causes the contribution of each process variable at the selected point to be displayed 202. As further described herein, other displays and interactions are possible.

For a batch process, several sets of variables may be considered when creating a multivariate model: the initial conditions for each batch, the measurements done during processing of each batch, and the final properties measured for each batch. Appropriate multivariate models may be constructed using, for example, multi-block multi-way partial least squares methods. Each set of variables defines a block, and each batch may be considered a single observation. The model also may consider each measurement as a separate variable. For example, if a batch has 250 temperature measurements, the model may consider this as a system having 250 different variables.

Comparison of scores from a batch data set may provide insight into batch-to-batch variations. The coefficients associated with each process variable in the model also reveal correlations present between initial conditions, process trajectories, and quality measurements.

Figure 3:
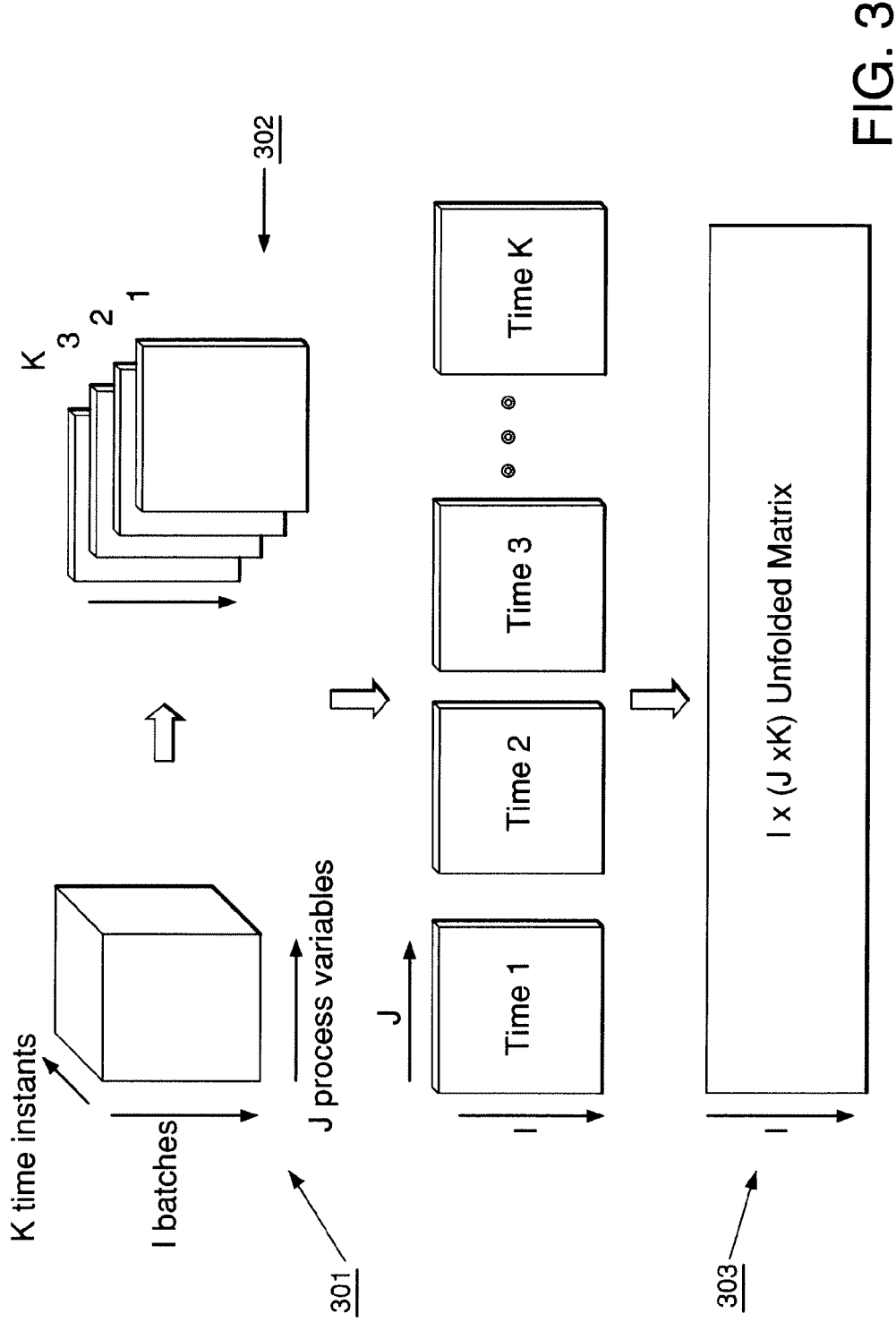
FIG. 3 shows a graphical representation of an exemplary unfolded matrix of batch data according to the invention.

Multivariate statistical process control methods also may be extended to batch processes by applying multi-way principal components analysis and/or partial least squares methods to an unfolded matrix of batch data as illustrated in FIG. 3. A three-dimensional array 301 may represent a data set from a batch process. The array includes data from/batches, each batch having J variables measured K times during processing. The array may be "sliced" into K slices 302, i.e., one slice per sample. Each slice then represents a single sample, and the principal components for a multivariate model can be calculated from a two-dimensional array 303 formed from the slices as shown.

Multivariate models used in the present invention may allow for monitoring of continuous, batch, multi-batch, and semi-batch processes. Processes may be monitored, diagnosed, and/or corrected based on data obtained after a batch or each batch, or batches may be monitored individually and adjusted during processing. Processes also may be monitored, diagnosed, and corrected in real time. It will be understood that other algorithms may be used in addition to and/or in place of the specific algorithms described herein to construct a multivariate model according to the invention. The systems and interfaces described herein also may be used with continuous, batch, multi-batch, and/or semi-batch processes.

In some configurations, systems according to the invention may create a multivariate model in real time. That is, instead of creating a multivariate model before any information is received from a process plant, the model may be created as data is received. For example, a process plant may include multiple sensors, monitors, and other data-collection devices as previously described. Data from these sources may be collected and transmitted to a system adapted to create a multivariate model of the process performed by the process plant. As the data is received, the multivariate model may be created, modified, and updated to reflect the most recent data. Thus, the multivariate model may be more responsive than, for example, a model that must be re-constructed before changes in the process may be incorporated into the model.

Figure 4:
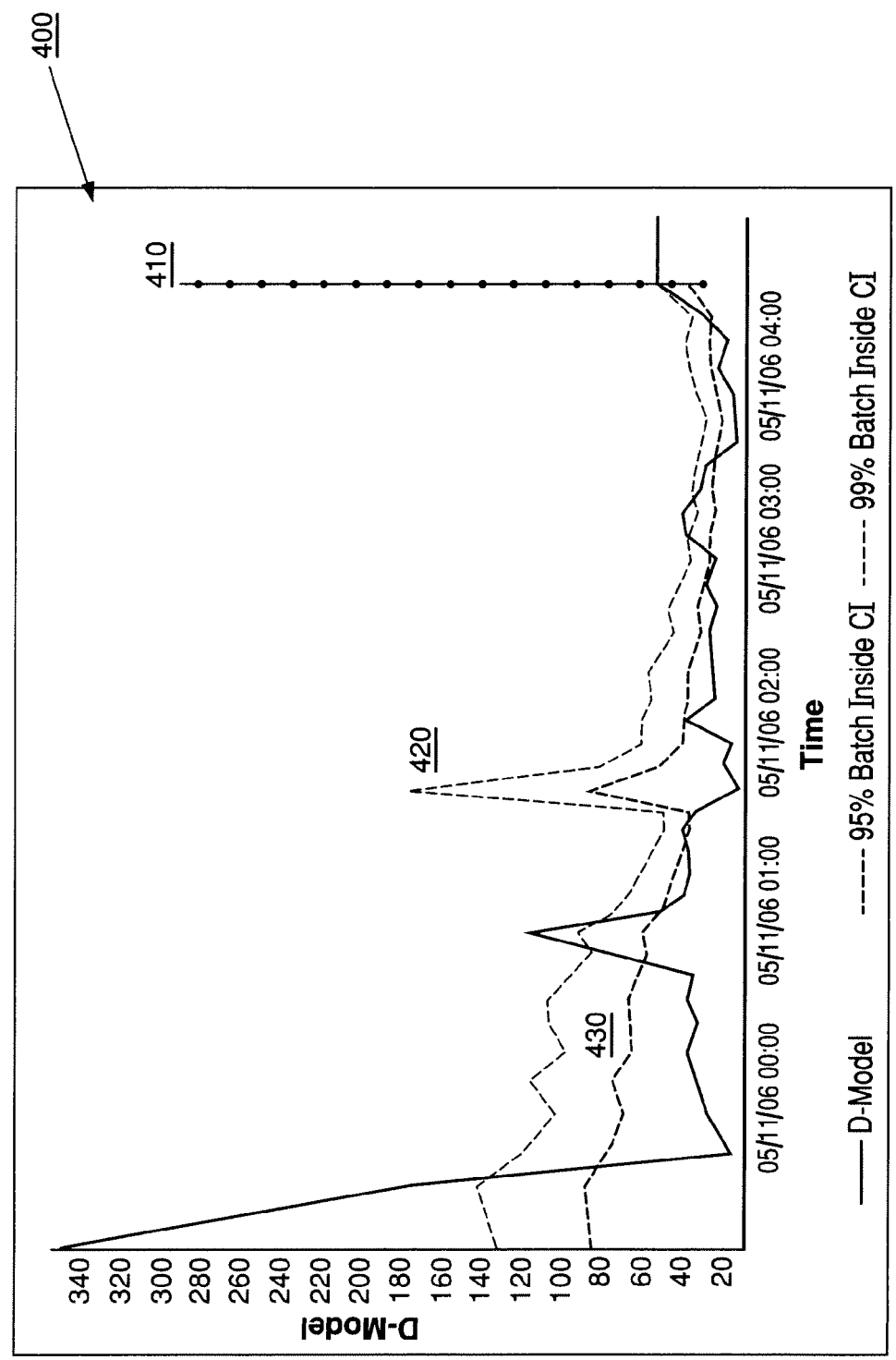
FIG. 4 shows an exemplary graphical interface according to the invention.

A user interface may present various aspects and views of a multivariate model, the data used to construct the multivariate model, and/or data generated by a multivariate model. An exemplary graphical interface according to the invention is shown in FIG. 4. The interface shows progression of one composite variable in a multivariate model ("D-Model") over time. The expected range for values of the variable may be indicated, such as by the upper and lower bounds 420, 430, respectively. The bounds may, for example, indicate that the process has failed if the composite variable exceeds the values contained within the bounds. The bounds also may indicate values for which the process requires adjustment or attention from a human operator, though the process has not failed. Other indications of appropriate or expected values may be displayed. A user may interact with the display, such as by marking a point on the display, selecting a point or range for further analysis, or performing other operations. An indication of a selected point or range may be displayed, such as the dotted line 410.

Figure 5:
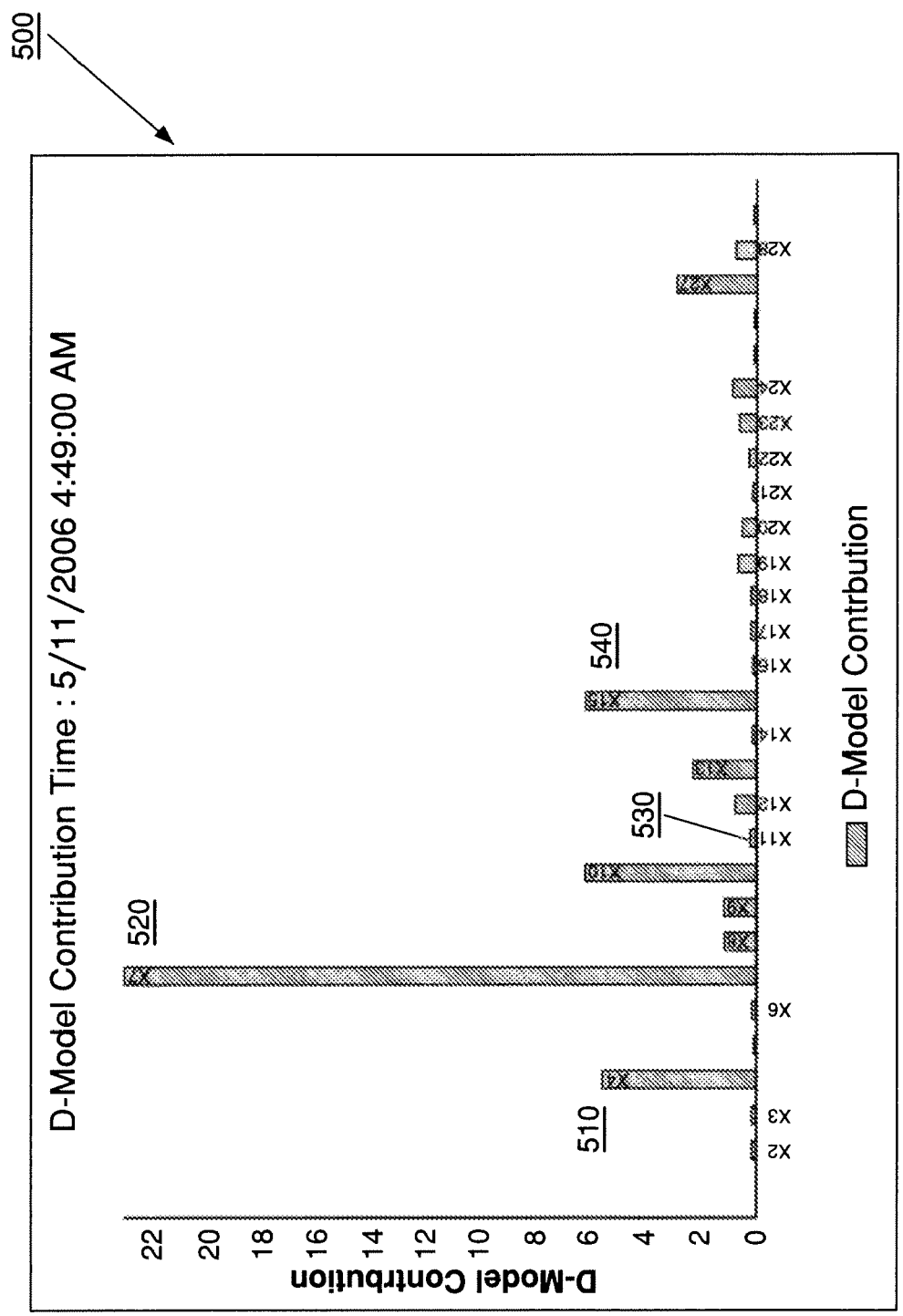
FIG. 5 shows an exemplary graphical interface according to the invention.

Another exemplary graphical interface according to the invention is illustrated in FIG. 5, which shows the contribution of multiple process variables to the composite variable illustrated in FIG. 4 at the selected point (i.e., a specific time-step). Various visualization techniques may be used to provide process variable contribution information. The exemplary interface 500 indicates the degree to which each process variable affects the value of the composite variable at the selected point by drawing a proportional bar for each variable. Thus, the larger the bar for a process variable, the greater effect the value of that process variable has on the composite variable at the selected point. Process variables 520 having a large effect on the composite variable may be assigned large bars (either highly positive or highly negative), while process variables 510, 530 having a lesser effect on the composite variable may be assigned smaller bars. Process variables 530 having relatively little to no effect on the composite variable may be assigned small or no bars. The interface may indicate the "direction" of each process variable's effect on the composite variable, such as where a process variable tending to move the composite variable downward (i.e., toward a smaller value) in the interface of FIG. 4 is assigned a negative-value bar, while process variables 510-540 tending to move the composite variable upward are assigned positive-value bars. Process variables having very little or no effect on the composite variable may be displayed with no bar, or may be suppressed from display in the interface 500. Other information may be displayed. The interface may allow a user to mark and/or select one or more process variables for identification, further analysis, or other operations. An indication of a selected process variable may be displayed.

Figure 6:
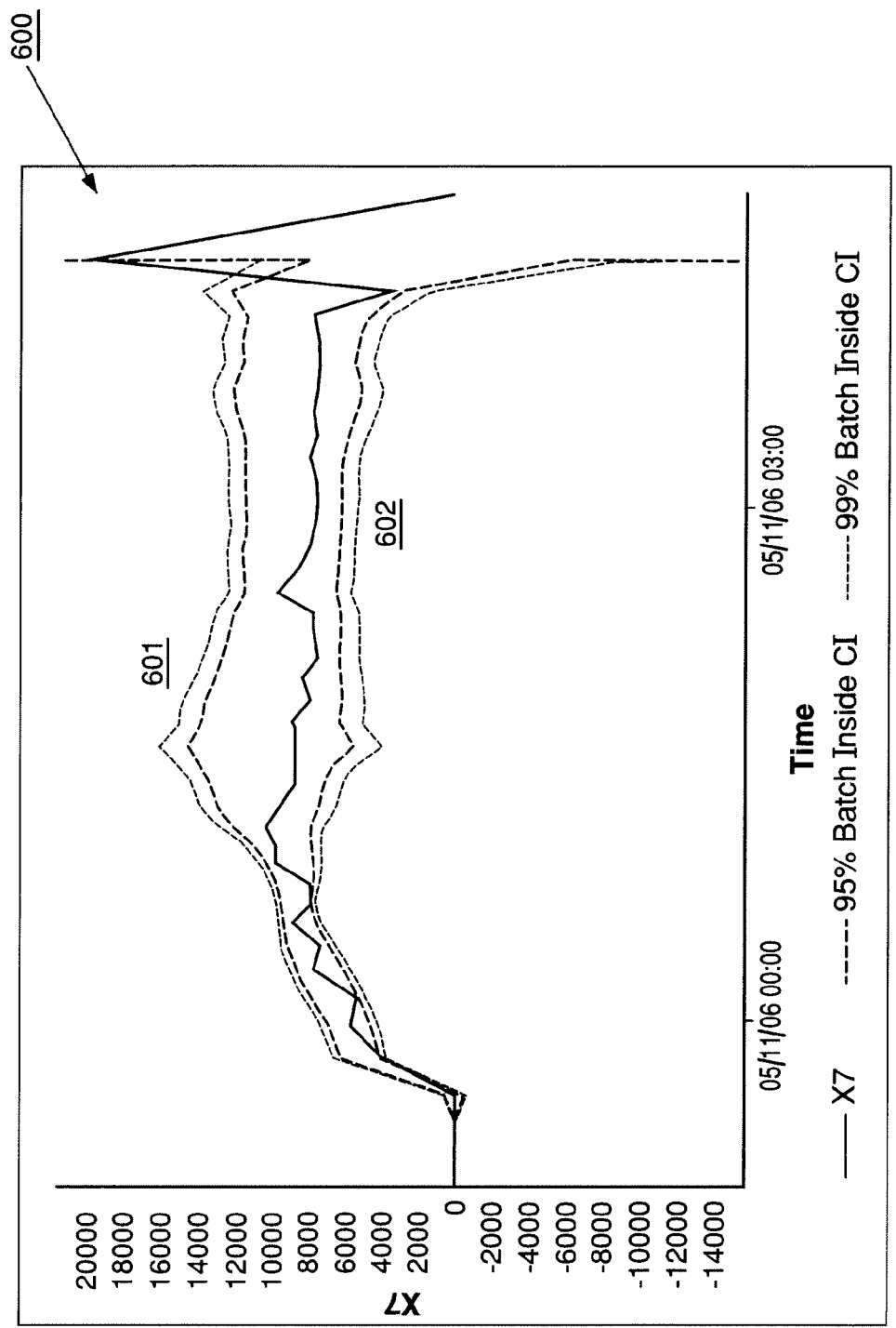
FIG. 6 shows an exemplary graphical interface according to the invention.

FIG. 6 shows another exemplary graphical interface according to the invention. The interface may display data about one or more process variables. The process variables may be selected by a user, such as by selecting one or more of the process variables displayed in a graphical interface such as the interface illustrated in FIG. 5. The interface may include expected or required ranges or bounds 601, 602 for the displayed process variable. Thus, the interface may indicate whether a specific process variable extends outside the values used by the process system or expected by the multivariate model.

The interfaces displayed in FIGS. 4-6 may be linked together by a computer system. For example, the first interface 400 may display the progression of single composite variable in a multivariate model over time. When a user desires information about a specific point in time or a point in the model, he may select the point 410 in the interface 400. The interface 400 may be linked to a second interface 500, which may display data about process variables used in the multivariate model at the point selected by the user. As previously described, various information and relationships may be displayed for one or more of the process variables. The interface 500 may be updated by data received from the first interface 400 after the user has selected a point for analysis, or it may be a static representation of the selected point. The user also may select one or more of the process variables displayed by the second interface 500 for further analysis, causing the selected process variables to be displayed in a third interface 600. For example, the third interface 600 may display the value of a selected process variable over a range of time, including the point 410 selected in the first interface 400. The interfaces 400, 500, 600 may receive information from a computer system and/or a process plant in real time, and also may be updated in real time to provide a user with current information. The interfaces also may be presented to a remote user, to allow for monitoring, diagnosis, and adjustment of the process and/or the process plant by a user geographically separate from the process.

Figure 7:
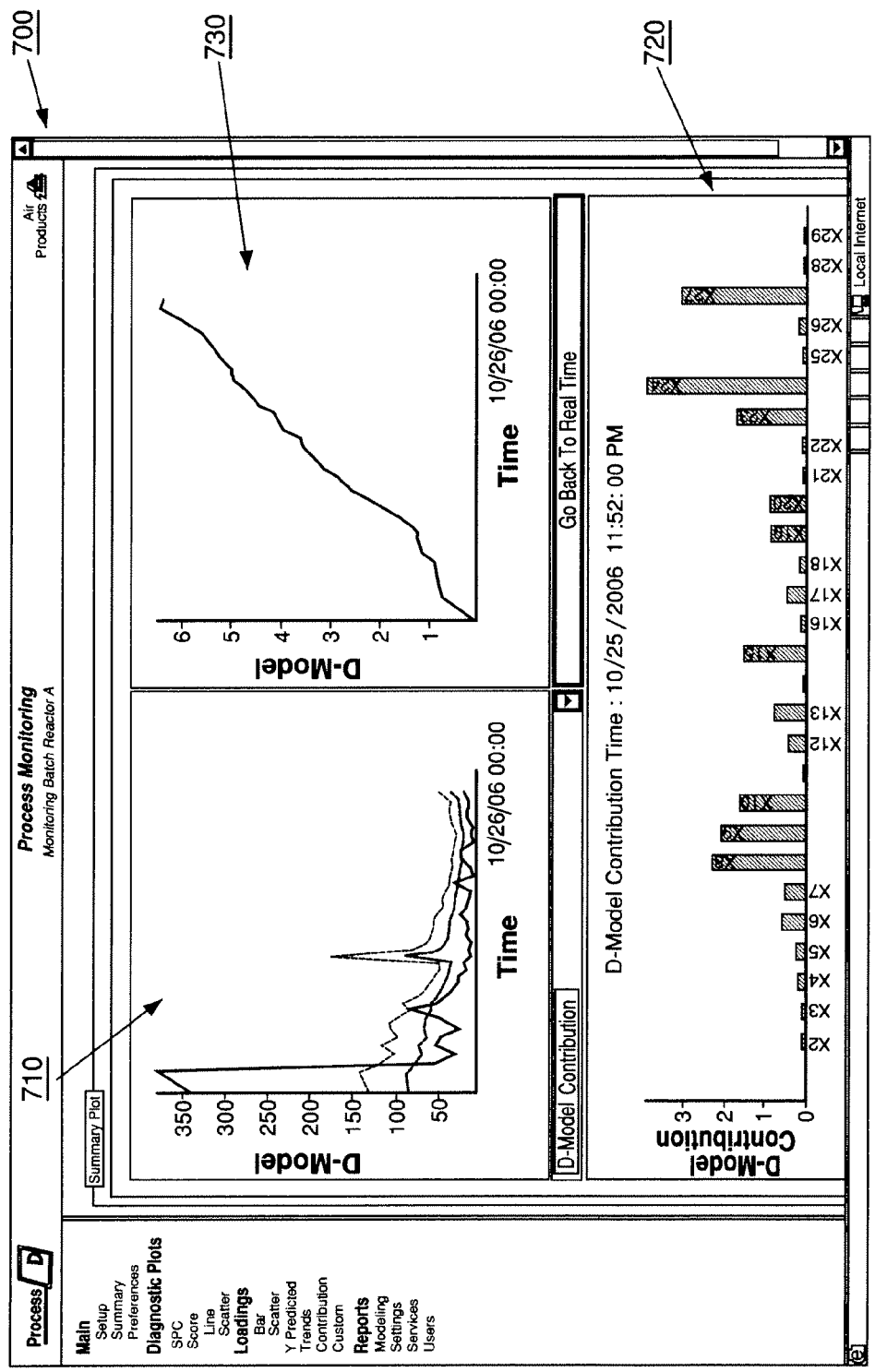
FIG. 7 shows an exemplary user interface according to the invention.

A single user interface may include multiple graphical interfaces, as illustrated in FIG. 7. The exemplary user interface 700 includes three interfaces 710, 720, 730. The interfaces may be linked as previously described with respect to FIGS. 4-6. The interfaces also may receive data and/or be updated in real time, and may be presented and controlled by a remote user. The interface may present types of data and visualizations other than those described with respect to FIGS. 4-6, including SPC, line, scatter, bar, prediction/trend, and custom plots. Reports and models also may be generated. As a specific example, the user interface may include an interface 710 showing one or more composite variables of a multivariate model, an interface 720 showing one or more process variables, and an interface 730 showing the contribution of one or more process variables to a multivariate model. Each display may be updated as process variable data is received. Thus, for example, the contribution of the various process variables to the model may be observed over time, while values for the relevant composite variable and/or process variables are charted over time. A user may select one or more portions in each interface for further analysis, such as selecting a process variable in the interface 730 that is then displayed over time in the process variable display 720. Other interactions between the interfaces are possible.

The interfaces described in FIGS. 4-7 may allow users to detect degradation in plant performance over time by analyzing composite variables and contributions of process variables over time. Users also may identify underlying causes of performance degradation, by analyzing the contribution of process variables to the overall process via a multivariate model and by analyzing the progression of individual process variables over time. Individual equipment pieces also may be evaluated by analyzing process variables and composite variables associated with the equipment. The combined interface may include other interfaces in addition to or instead of the specific examples shown. For example, an interface showing how a monitored process deviates from a mean trajectory of a multivariate model may be displayed. Each displayed interface may be linked to other interfaces. For example, if a user selects a time point in an interface showing the process deviation from a mean trajectory over time, the contribution of each process variable to the multivariate model at the selected time point may be displayed. Other interfaces also may be provided.

The interfaces and analyses described herein also may allow for early fault detection and prediction of product properties during performance of a process. For example, FIG. 7 may summarize a complex process in a small number of interactive graphical plots, which can provide an overview of the process. Since the various graphical interfaces may be linked to one another, it also may allow a user to "drill down" through complex models to isolate a variable or measurement of interest.

The user interfaces described herein may be updated in real time. As previously described, systems used to create a multivariate model and provide a user interface may receive data from a process plant, such as values for various process variables used to create the multivariate model. As this data is received, the multivariate model and/or user interfaces related to the model and to operation of the process plant may be updated to reflect the new data. Thus, the user interfaces may present the most current data and analysis available. The various interfaces described herein may be provided in a single interface, such as is illustrated in FIG. 7, or may be displayed in separated interfaces such as independent windows. For example, the interfaces shown in FIGS. 4-6 may be linked across multiple windows, so that when a user selects a time point in FIG. 4, FIG. 5 is displayed in a separate window or interface, while still being linked to FIG. 4 as previously described. Other configurations are possible.

Figure 8:
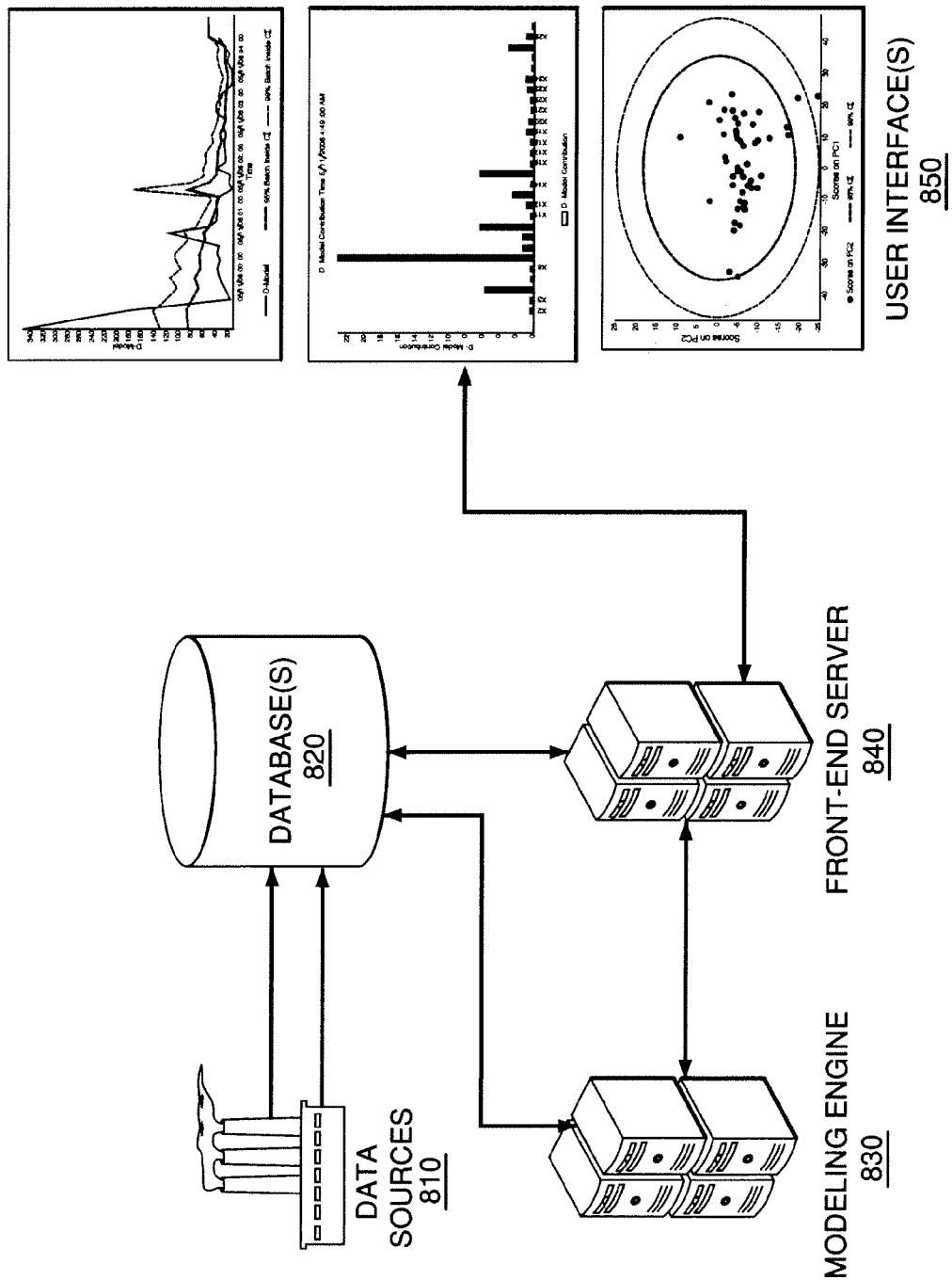
FIG. 8 shows a system for monitoring a process plant according to the present invention.

FIG. 8 shows a system for monitoring a process plant according to the present invention. One or more data sources 810, such as sensors in a process plant, may transmit data to the system. The data may be transmitted continuously, at regular intervals, irregularly, on demand, or at any other suitable time. The data may be captured by one or more databases 820 that store the data for analysis. A modeling engine 830 and a front-end server 840 may use and analyze the data stored in the database 820. For example, the front-end server 840 may be a web server such as the Microsoft Internet Information Server or the Apache web server that collects data from the database 820 and/or the modeling engine 830 for presentation to a user over a communication link. The modeling engine 830 may use the stored data to generate a multivariate model of the process described by the data sources 810. The front-end server 840 may collect and format data for display to a user in one or more user interfaces 850 as previously described. The database 820, front-end server 840, modeling engine 830, and user interface 850 may be software modules on one or more hardware systems, and may be combined into any suitable combination of hardware and software. For example, the front-end server 840 and modeling engine 830 may be constructed using common hardware, or may be separate physical devices. The various components may communicate over any suitable communication medium, such as wired or wireless systems, private networks, the public Internet, and other networks. The database 820, front-end server 840, modeling engine 830, and user interface 850 may each be remote from the data sources, and each also may be remote from each other element in the system. Notably, the user interface 850 may be transmitted to a remote user computer system by the front-end server, allowing for remote access to the system by a user.

Figure 9:
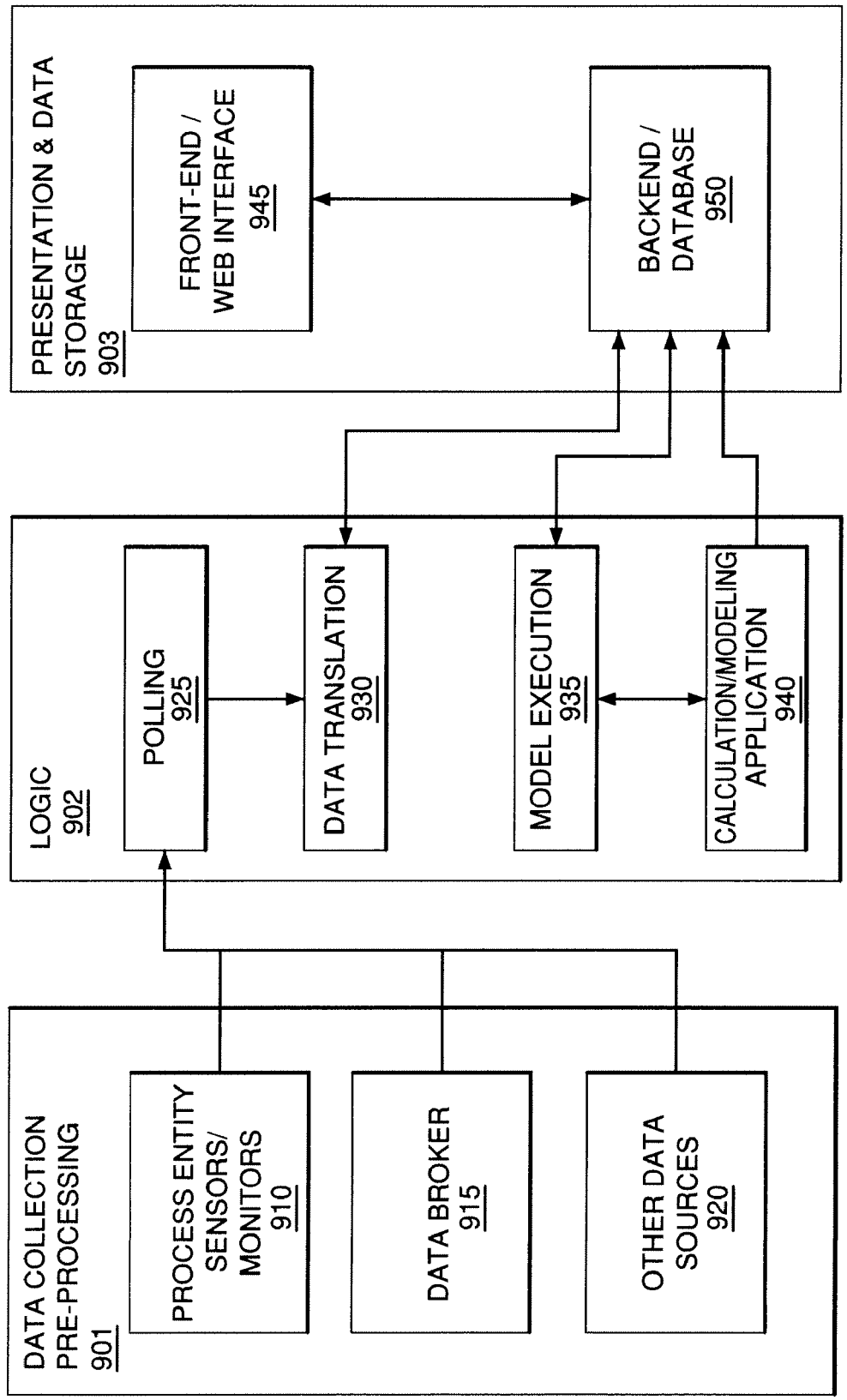
FIG. 9 is a schematic representation of an exemplary system and data flow according to the invention.

FIG. 9 is a schematic representation of an exemplary system and data flow according to the invention. The system may be described using three layers: process control 901, logic 902, and presentation and data storage 903. The layers may be logical layers, i.e., they may not correspond to any physical separation of the layers or systems implementing the functionality of each layer. The data collection and pre-processing layer 901 may interrogate one or more data sources and perform additional data extraction. The layer may include receivers/aggregators that receive data from process entity monitors (e.g., sensors within a process plant) 910, one or more data brokers 915, and other data sources 920. Data brokers may be, for example, structured data sources such as relational databases. A data broker may be a single database, or it may include multiple databases. This data may be collected by a polling module 925 in the logic layer. For example, where data is available from process plant monitors, a polling unit may occasionally request current or updated data from each monitor. A data translation module 930 may convert the received data to a common format or perform other transformations before storing the data in a backend system such as a database 950. The data also may be translated according to pre-determined product logic and process phase logic. The data translation module also may invoke a calculation module 940 to process the extracted and translated data. The stored data may be used by a model execution module 935 that executes and coordinates a calculation and modeling application 940 that includes stored routines such as PCA/PLS-type multivariate statistical methods. The application 940 may be a commercially-available package such as MATLAB, or it may be a customized application suited to creating specific models or models suitable for a particular process, industry, or technology. The application 940 also may include multiple application components, such as where a commercially-available package performs general calculations, and a custom package creates a process-specific model. A front-end interface 945, such as a web server, may provide data, calculations, and models to one or more users. The front-end may provide an interactive user interface, including a framework and logic to support data lookups, input configuration, and result displays.

An exemplary embodiment of the present invention will now be described. It will be understood that variations other than those described with respect to the specific embodiment are possible, and may be included within the scope of the invention. An exemplary system may divide users into several types, such as operators, supervisors, administrators, and services. An operator is a user who can view results information, such as data presented as set of plots and reports. A supervisor is a user who can specify parameters to query database, define computations required for reporting, and view a batch summary for a process plant. An administrator is a user who can set users' permission levels, modify entries in the database directly, and manage other user accounts. A service is a system user that can perform periodic or occasional actions such as polling a database for process data, translation of process phases and products, and data storage.

A software application in the system may include a series of nested web pages broadly organized in two sections: settings and results. Various administrative pages are available from within the settings section. Administrative pages may include functionalities to define parameters for internal reference tables, define phase logic, and configure security settings of the application. Results pages may allow a user to display results of calculations and real-time monitoring of data sources.

Figure 10:
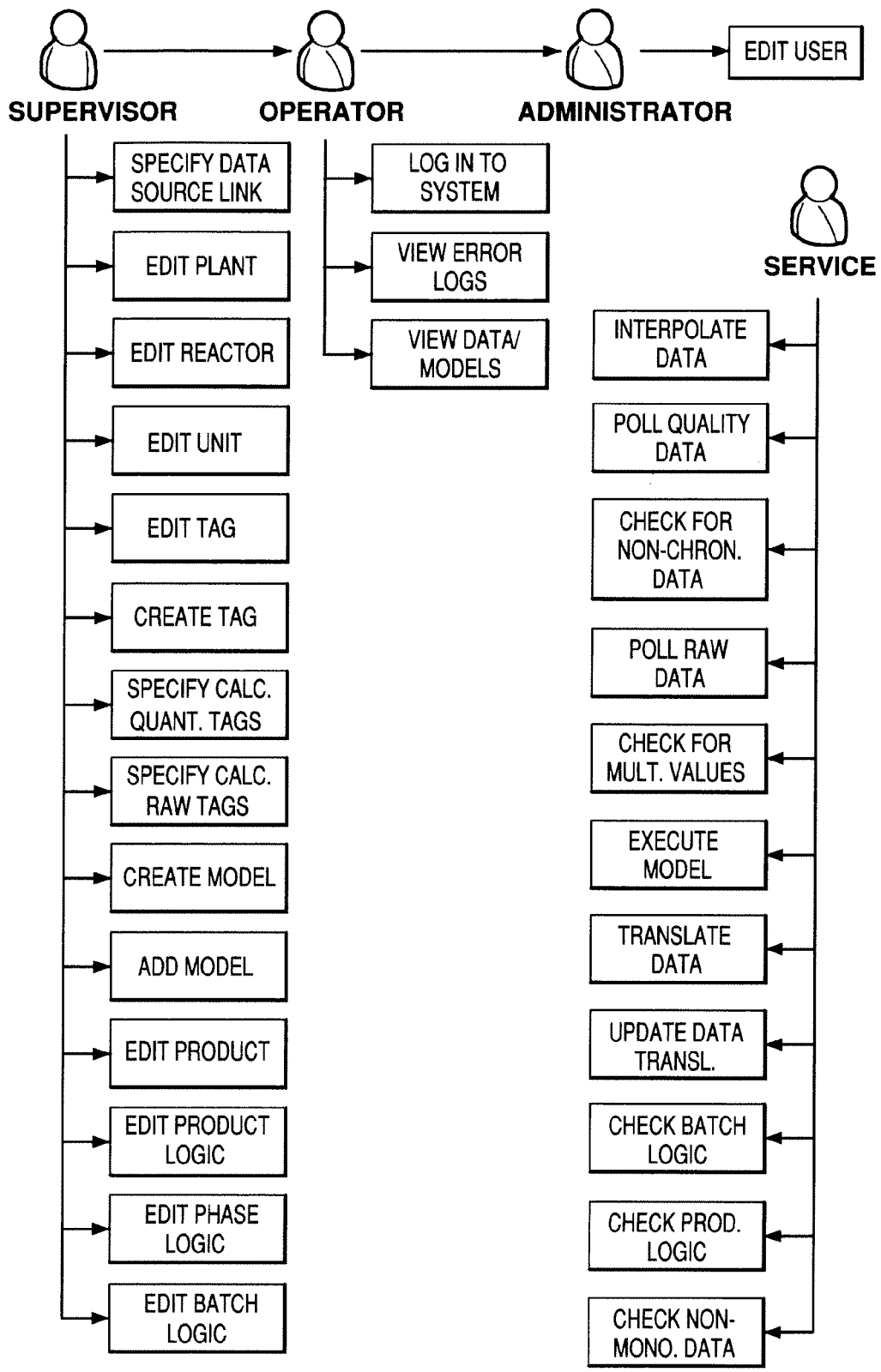
FIG. 10 is a schematic representation of an exemplary use case according to the invention.

Features of a system according to the present invention may be described using use cases. Features and operations in the system may use multiple use cases, and use cases may interoperate with multiple parts of the system as previously described. A specific, non-limiting use case is described and illustrated in FIG. 10. Other use cases may be implemented to define and use the systems and methods described herein.

Log in to System: A user may enter a website linked to user interfaces (e.g., user interfaces 700 and 850.) The system retrieves the user name, and determines his Permissions. For example, user information may be stored in a general authentication system, such as a Microsoft Windows authentication method. The user then may be logged into the system and provided access to the appropriate functionality.

Edit User: An administrator may set or modify a user's name, login and permission levels.

Specify Data Source Link: The system may display a list of existing data sources. A user may select an appropriate data source to edit or add a new data source. Within a data source, a user may select a specific object, such as a process plant or plant unit from the data source. The user also may select properties of the object, such as data type, data source type, time zone, ODBC name, and other parameters. This data may be stored in a database (e.g., database 820 or 950).

Edit Plant: The system may display a list of process plants for which data can be collected. The user may select from the list of known plants, or may add a new one. For example, a single user interface and reporting system may be used to monitor multiple plants. A user may add a new plant for monitoring by specifying a data source, a data source link, a process plant name, a process type, and/or other information about the new plant. Properties of existing plants can also be modified.

Edit Unit/Product: As with creating and editing plants, a user can also create and edit units, products, and other entities in the system.

Create/Edit Tag Tags: A user may apply tags to specify contextual information about an object. Each tag can include a name, lower and upper bounds, a frequency (e.g., poll at various intervals), tolerance (e.g., how close to the frequency the actual poll must be), interpolation type (e.g., monotonic or not), and other attributes. For each tag, the system may perform integrity checking, such as verifying that a lower bound is less than an upper bound, or that the tolerance is less than the frequency. For each tag, the system may calculate a time to start collecting data and a historical time range to use for stored data based on parameters provided by the user and other parameters specified in the system. The system may use the tag data to determine when to collect data from each tagged data source.

Edit Product Logic: A user may specify product logic for batch processes or portions of batches. To edit a product logic, the user selects an object (plant or unit) and enters an expression for the product logic. The system may verify that the entered expression satisfies the syntax requirements of the system and/or the process with which the product is associated.

Edit Batch Logic: Similarly, a user may specify batch logic by selecting an object and entering phase logic for the batch. Typically, if the selected object is a continuous plant then the batch logic is applied to all products in the plant.

Edit Phase Logic: The user also may specify phase logic for a batch plant or part of a batch plant by selecting a phase name and entering expressions for the start, end, and maximum processing times. These expressions may be verified by the system.

Update Data Translation: The system may update data translations by stopping recurring calls of to translation modules for an object, removing data translation results for time points between the current time and the polling start time for the object, performing data translation for time points between the current time and the polling start time, and re-starting recurring calls of data translation modules for the object.

Specify Calculation Raw Tags: A user may select an object and enter raw calculation tags for the object. Expressions entered by a user may be checked for syntax by the system before being stored.

Specify Calculation Quality Tags: A user may select an object and enter raw calculation tags for the object. Expressions entered by a user may be checked for syntax by the system before being stored.

Poll raw data: A service may poll raw data from data sources. The service may poll data sources at a frequency specified for each data source and each tag (for process variables).

Check for non-chronological raw data: A service may check data of previous time periods for non-chronological data.

Check for multiple raw values: A service may determine if there is more than one value for the same time stamp.

Poll quality data: A service polls quality data from quality data source. It may repeat regularly at a frequency for each data source.

Translate raw data: This service translates raw data to identify product and phase for an object.

Check Product/Batch Logic: A service may check product and/or batch logic at a given time point.

Check for non-monotonic data: A service may check monotonic tags for non-monotonic data inside batch reusers.

Translate quality data: A service may translate quality data and translated raw data to link new raw batches with their corresponding quality data.

Interpolate data: The system may interpolate tag values for a time point on the basis of tag data from the database.

Create Model: The system may create multivariate models as previously described that will be used for monitoring future plant data. An exemplary event flow may include:
(1) User defines properties for the model, such as:
   (a) Object (e.g., Plant, ReUser or Unit)
   (b) Product
   (c) Method of scaling (d) Algorithm
(e) Alignment
(f) Projecting future values
(2) System generates default name for the model.
(3) User modifies model name if needed.
(4) User enters properties to select batches (or time ranges for continuous processes), such as:
 (a) Starting time
 (b) End time
 (c) Phase
(5) System shows list of batches for batch plant (e.g., batch name, start time, and end time) or time ranges for continuous plants (e.g., start time and end time) for selected parameters.
(6) User includes/excludes batches in the list.
(7) User selects a set of tags from list of available tags. The list may include extracted tags as well as calculated ones. These tags can be used as columns of source data set (X matrix).
(8) User selects Variable Category for each selected tag. A default may be specified, typically "control variable".
(9) For each control and manipulated variable, the user can specify various properties, such as:
 (a) lower bound
 (b) upper bound
 (c) target
(10) User selects alignment base from the list.
 (a) For a continuous plant, then the list may include only time.
 (b) For a batch plant, the list may include time and monotonic tags.
(11) User selects profile for alignment. This information may be used to generate rows in source data set. The profile can be uniform and user-defined.
(12) System generates Data Set for the calculation routine.
 (a) For a continuous plant, the data set has 2 dimensions (e.g., time and tags).
 (b) For a batch plant, the data set has 3 dimensions (e.g., batch, alignment base, tags).
(13) System calls calculation routine.
(14) If there is an error in calculation routine, then system informs user about the error.
(15) System shows report with model settings as well as with results of calculation.
(16) User performs a use-case (e.g., "Add Model").

Add Model: A user may add a created model to the list of executing models. The user may define attributes of the model, such as frequency (e.g., real-time, 1 min, 5 min, or a custom time).

Execute Model: A service may run the model calculations based on the data from the database. The use case may repeats regularly within time intervals specified for each model.

View error logs: A supervisor may view errors that occurred while retrieving data from the database. Various other services and applications may populate the error log.

The various systems described herein may each include a computer-readable storage component for storing machine-readable instructions for performing the various processes as described and illustrated. The storage component may be any type of machine readable medium (i.e., one capable of being read by a machine) such as hard drive memory, flash memory, floppy disk memory, optically-encoded memory (e.g., a compact disk, DVD-ROM, DVD±R, CD-ROM, CD±R, holographic disk), a thermomechanical memory (e.g., scanning-probe-based data-storage), or any type of machine readable (computer readable) storing medium. Each computer system may also include addressable memory (e.g., random access memory, cache memory) to store data and/or sets of instructions that may be included within, or be generated by, the machine-readable instructions when they are executed by a processor on the respective platform. The methods and systems described herein may also be implemented as machine-readable instructions stored on or embodied in any of the above-described storage mechanisms. The various communications and operations described herein may be performed using any encrypted or unencrypted channel, and storage mechanisms described herein may use any storage and/or encryption mechanism.

Although the present invention has been described with reference to particular examples and embodiments, it is understood that the present invention is not limited to those examples and embodiments. The present invention as claimed therefore includes variations from the specific examples and embodiments described herein, as will be apparent to one of skill in the art.

The invention claimed is:

1. A system comprising:
 a data collector to receive process monitoring data describing a process performed by a process plant, the process monitoring data comprising values for a plurality of process variables;
 a processor to construct a multivariate model of the process as data is received by the data collector; and
 a user interface in communication with the processor to present information describing the process, comprising:
  a first graphical interface to indicate performance of the process plant based on the multivariate model;
  a second graphical interface to display the contribution of at least one of the plurality of process variables to the multivariate model; and
  a third graphical interface to display an indication of the deviation of the process from a range expected by the multivariate model.

2. The system of claim 1, wherein the user interface is web-based.

3. The system of claim 1, wherein the user interface is presented to a user in real time.

4. The system of claim 1, wherein the user interface is presented to a remote user.

5. The system of claim 1, wherein the first graphical interface presents the behavior of a composite variable of the multivariate model as a function of time.

6. The system of claim 1, wherein the second graphical interface presents the contribution of at least one of the plurality of process variables to the multivariate model at a time point of the multivariate model selected by a user.

7. The system of claim 1, wherein the first graphical interface and the second graphical interface are presented to a user concurrently.

8. The system of claim 7, wherein the third graphical interface is displayed to the user concurrently to the first and second graphical interfaces.

9. The system of claim 7, wherein the user interface presents data in real time.

10. A method comprising:
 based on data received from a process plant, constructing a multivariate model of a process performed by the process plant, the multivariate model being constructed as the data is received;
 presenting a user interface to a remote user, the user interface displaying the value of a composite variable of the multivariate model over time, the composite variable being created from a plurality of process variables;
 updating the user interface as the data is received;

receiving a selection of a time point in the composite variable display; and displaying the contribution of at least one of the plurality of process variables to the composite variable at the selected point.

11. The method of claim 10, further comprising:

receiving a selection of a displayed process variable from the remote user; and displaying the value of the selected process variable over a time range.

12. The method of claim 10, wherein the value of the composite variable is updated and displayed in real time.

13. The method of claim 10, wherein the user interface is a web-based interface.

14. The method of claim 11, wherein the user interface, the contribution of at least one of the plurality of process variables, and the value of the selected process variable are displayed to the user concurrently.

15. The method of claim 14, wherein at least one of the user interface, the contribution of at least one of the plurality of process variables, and the value of the selected process variable are updated in real time.

16. A computer-readable storage medium storing a plurality of instructions which, when executed by a processor, cause the processor to perform a method comprising:

based on data received from a process plant, constructing a multivariate model of a process performed by the process plant, the multivariate model being constructed as the data is received;

presenting a user interface to a remote user, the user interface displaying the value of a composite variable of the multivariate model over time, the composite variable being created from a plurality of process variables;

updating the user interface as the data is received;

receiving a selection of a time point in the composite variable display; and displaying the contribution of at least one of the plurality of process variables to the composite variable at the selected point.

17. The computer-readable storage medium of claim 16, wherein the method further comprises:

receiving a selection of a displayed process variable from the remote user; and displaying the value of the selected process variable over a time range.

18. The computer-readable storage medium of claim 16, wherein the user interface, the contribution of at least one of the plurality of process variables, and the value of the selected process variable are displayed to the user concurrently.

19. The computer-readable storage medium of claim 16, wherein at least one of the user interface, the contribution of at least one of the plurality of process variables, and the value of the selected process variable are updated in real time.

20. The computer-readable storage medium of claim 16, wherein the value of the composite variable is updated and displayed in real time.

21. The computer-readable storage medium of claim 16, wherein the user interface is a web-based interface.

22. A method comprising:

constructing a multivariate model of a process described by a plurality of process variables in real time based on data received from a process plant;

presenting a web-based user interface to a remote user, the interface displaying:

a composite variable of the multivariate model over time;

an indication of the contribution of at least one of the plurality of process variables to the composite variable at a time point; and the deviation of the process from an expected mean trajectory;

receiving a selection of a time point in composite variable display; and updating the indication of the contribution of the at least one of the plurality of process variables to display the contribution of the at least one process variable at the selected time point.

23. The method of claim 22, wherein the composite variable display is updated in real time.

24. A computer-readable storage medium storing a plurality of instructions which, when executed by a processor, cause the processor to perform a method comprising:

constructing a multivariate model of a process described by a plurality of process variables in real time based on data received from a process plant;

presenting a web-based user interface to a remote user, the interface displaying:

a composite variable of the multivariate model over time;

an indication of the contribution of at least one of the plurality of process variables to the composite variable at a time point; and the deviation of the process from an expected mean trajectory;

receiving a selection of a time point in composite variable display; and updating the indication of the contribution of the at least one of the plurality of process variables to display the contribution of the at least one process variable at the selected time point.

25. The computer-readable medium of claim 24, wherein the composite variable display is updated in real time.

* * * * *